United States Patent [19]

Biondo et al.

[11] Patent Number: 5,783,318
[45] Date of Patent: Jul. 21, 1998

[54] REPAIRED NICKEL BASED SUPERALLOY

[75] Inventors: Charles M. Biondo, Palm Beach Gardens; William J. Gostic, Tequesta; Christopher D. Parmley; John C. Tanzola, both of Jupiter, all of Fla.

[73] Assignee: United Technologies Corporation, Hartford, Conn.

[21] Appl. No.: 486,233

[22] Filed: Jun. 7, 1995

Related U.S. Application Data

[62] Division of Ser. No. 264,147, Jun. 22, 1994, abandoned.

[51] Int. Cl.$^6$ .................................................. B32B 15/00
[52] U.S. Cl. .......................... 428/680; 148/512; 148/527; 428/637
[58] Field of Search .............................. 428/680, 637; 219/76.16, 76.1; 228/119, 203, 262.3; 427/456, 142; 148/512, 527

[56] References Cited

U.S. PATENT DOCUMENTS

| | | | |
|---|---|---|---|
| 3,479,157 | 11/1969 | Richards et al. | 29/196.6 |
| 3,516,826 | 6/1970 | Ward et al. | 420/448 |
| 3,617,685 | 11/1971 | Brill-Edwards | 228/262.3 |
| 3,711,337 | 1/1973 | Sullivan et al. | |
| 3,807,993 | 4/1974 | Dalai et al. | |
| 3,832,167 | 8/1974 | Shaw et al. | |
| 3,928,026 | 12/1975 | Hecht et al. | |
| 4,008,844 | 2/1977 | Duvall et al. | 228/119 |
| 4,054,723 | 10/1977 | Higginbotham et al. | 428/678 |
| 4,073,639 | 2/1978 | Duvall et al. | |
| 4,078,951 | 3/1978 | Denzine et al. | |
| 4,285,459 | 8/1981 | Baladjanian et al. | 228/119 |
| 4,340,425 | 7/1982 | Barrett et al. | 420/445 |
| 4,705,203 | 11/1987 | McComas et al. | 228/119 |
| 4,719,080 | 1/1988 | Duhl et al. | 420/443 |
| 4,743,514 | 5/1988 | Strangman et al. | 428/678 |
| 4,820,356 | 4/1989 | Blackburn et al. | |
| 4,830,934 | 5/1989 | Ferrigno et al. | 428/678 |
| 4,849,030 | 7/1989 | Darolia et al. | |
| 4,878,953 | 11/1989 | Salzman et al. | 228/119 |
| 4,961,818 | 10/1990 | Benn | 228/262.3 |
| 4,983,233 | 1/1991 | Henry | 148/428 |
| 5,037,495 | 8/1991 | Henry | 148/410 |
| 5,043,138 | 8/1991 | Darolia et al. | 420/443 |
| 5,068,084 | 11/1991 | Cetel et al. | 420/445 |
| 5,069,873 | 12/1991 | Harris et al. | 148/428 |
| 5,071,059 | 12/1991 | Heitman et al. | 228/262.3 |
| 5,100,484 | 3/1992 | Wukusick et al. | |
| 5,104,614 | 4/1992 | Ducrocq et al. | 420/448 |
| 5,143,563 | 9/1992 | Krueger et al. | 148/410 |
| 5,151,249 | 9/1992 | Austin et al. | 420/445 |
| 5,156,321 | 10/1992 | Liburdi et al. | 228/119 |
| 5,171,380 | 12/1992 | Henry | 148/428 |
| 5,173,255 | 12/1992 | Ross et al. | 420/445 |
| 5,240,491 | 8/1993 | Budinger | 228/119 |
| 5,270,123 | 12/1993 | Walston | 420/445 |
| 5,316,866 | 5/1994 | Goldman et al. | 420/448 |
| 5,395,584 | 3/1995 | Berger et al. | 420/443 |

FOREIGN PATENT DOCUMENTS

| | | |
|---|---|---|
| 0 194 391 | 9/1986 | European Pat. Off. . |
| 0 362 661 | 4/1990 | European Pat. Off. . |
| 0 504 095 | 9/1992 | European Pat. Off. . |
| 2 208 177 | 10/1972 | Germany . |
| 2132022 | 1/1973 | Germany . |
| 51-134341 | 11/1976 | Japan . |
| 2124126 | 2/1984 | United Kingdom ............ 228/119 |
| WO 92/03241 | 3/1992 | WIPO . |

OTHER PUBLICATIONS

Metals Handbook, 9th Ed. vol. 15, pp. 815–819; STIC TA 472.A3, 1988.

*Primary Examiner*—Margery Phipps
*Attorney, Agent, or Firm*—Reid & Priest LLP

[57] ABSTRACT

A repaired nickel-based superalloy substrate that has applied thereon a nickel-based polycrystalline repair alloy comprising 0.03–2.5 weight % hafnium, 0.003–0.32% boron, 0.02–0.16% yttrium and 0.007–0.35% zirconium. The present invention further provides a repaired single crystal alloy substrate that has applied thereon a repair alloy wherein the repair alloy's composition is similar to or the same as the single crystal alloy composition except that the repair alloy additionally comprises at least one grain boundary strengthener element and at least one element that enhances oxidation resistance.

10 Claims, 1 Drawing Sheet

375 CYCLES @ 2200° F

HOT SIDE OF TEST BAR INCLUDING REPAIR BUILD-UP

OPPOSITE FACE OF TEST BAR WITHOUT REPAIR BUILD-UP

REPAIRED NICKEL BASED SUPERALLOY

This is a divisional application of U.S. patent application Ser. No. 08/264,147, filed Jun. 22, 1994, now abandoned.

FIELD OF THE INVENTION

This invention relates to a method for the repair of nickel-based equiaxed, directionally solidified, and single crystal superalloys. The present invention also provides polycrystalline nickel-based alloys comprising 0.03 to 2.5 weight % hafnium, 0.003 to 0.32 weight % boron, 0.02 to 0.16 weight % yttrium, and 0.007 to 0.35 weight % zirconium, and the use of these alloys in the repair of equiaxed, directionally solidified, and single crystal nickel-based alloy substrates, such as airfoils. The present invention further provides a repair alloy and a method for the repair of single crystal superalloys.

BACKGROUND OF THE INVENTION

Nickel-based superalloys have found use in a variety of high technology applications. Single crystal, directionally solidified and equiaxed nickel-based alloys that exhibit strength and oxidation resistance at high temperature are particularly useful in forming engine components. Examples of single crystal nickel-based superalloys can be found in U.S. Pat. Nos. 4,849,030 (Darolia et al.), 4,719,080 (Duhl et al.) and 5,151,249 (Austin et al.). Other examples of nickel-based alloys are disclosed in U.S. Pat. Nos. 3,832,167 (Shaw et al.), 4,983,233 (Henry), 5,171,380 (Henry), and U.S. patent application Ser. No. 07/944,184 (Gostic et al.). All references cited herein are incorporated by reference as if reproduced in full below.

Since articles composed of nickel-based superalloys are often expensive or difficult to replace, there is a need for methods of preventing damage to or repairing such articles, especially articles composed of single crystal nickel-based superalloys. In an effort to prevent damage to the underlying substrates, various protective coatings have been applied to the surface of articles formed of nickel-based superalloys. See e.g., U.S. Pat. Nos. 4,054,723 (Higginbotham et al.), 4,743,514 (Strangman et al.), and 5,043,138 (Darolia et al.).

U.S. Pat. No. 4,830,934 (Ferrigno et al.) discloses a method for the repair of multi-crystalline nickel-based superalloys using a nickel-based repair alloy. A method for the repair of articles formed from superalloys which repairs a damaged alloy substrate by brazing onto the damaged substrate a mixture of a transient liquid phase (TLP) alloy and a higher melting alloy is described in U.S. Pat. Nos. 4,008,844 and 4,073,639 (Duvall et al.).

Despite prior efforts in the areas of coatings on nickel-based substrate alloys and repair of nickel-based superalloys, there remains a need for new methods of repairing nickel-based superalloy substrates, especially single crystal nickel-based superalloy substrates. There is a corresponding need for a nickel-based alloy that is suitable for the coating or repair of substrates. These needs are exacerbated by the increasing operating temperatures of modern and developing engines and the accompanying increased rate of erosion of engine components. Build-up of the eroded areas is required for continued operation, to provide recontour to original performance configurations and to create an erosion barrier to protect the underlying remaining substrate.

OBJECTS OF THE INVENTION

Thus, it is an object of the present invention to provide a method of repairing a single crystal nickel-based superalloy, and a nickel-based build-up repair alloy for use in this method.

It is another object of the present invention to provide a method of repairing nickel-based substrate alloys, and a repair alloy for use in this method.

It is a further object of the present invention to provide polycrystalline nickel-based repair alloys having good durability and oxidation resistance at high temperature.

It is yet another object of the present invention to provide a method of repairing a single crystal substrate alloy, and a repair alloy for use in this method.

SUMMARY OF THE INVENTION

The present invention provides a method for the repair of nickel-based superalloy substrates by the application of a repair alloy wherein the repair alloy's composition is similar to or the same as the nickel-based superalloy composition except that the repair alloy additionally controls the specific levels of elemental grain boundary strengtheners and/or oxidation resistance enhancers. The present invention also provides a method for the repair of single crystal alloy substrates by the application of a repair alloy wherein the repair alloy's composition is similar to or the same as the single crystal alloy composition except that the repair alloy additionally comprises grain boundary strengtheners and/or oxidation resistance enhancers.

In the present invention, repair alloys deposited onto a superalloy substrate should exhibit good bonding and a good thermal expansion match with the substrate. For these reasons, it is desirable that the repair alloy have a composition that is similar to the composition of the substrate alloy. Because current application techniques produce a polycrystalline repair alloy, it is also important to the present invention that the repair alloy contain grain boundary strengtheners. Grain boundary strengthening elements are known in the metallurgical arts, and may vary depending upon the composition of the matrix alloy. During casting and subsequent heat treatment, grain boundary strengtheners tend to diffuse into grain boundaries in the microstructure of an alloy, resulting in enhanced creep and rupture ductility. In cases in which the repair alloy is applied to a single crystal or directionally solidified substrate article the requisite grain boundary strengthening elements may not be available from the substrate metal for diffusion into the applied repair alloy. Therefore, in these instances, it is important to provide grain boundary strengthening elements in the repair alloys of the present invention. In the case where the substrate alloy is a polycrystalline nickel-based superalloy, the repair alloy typically does not require additional amounts of grain boundary strengtheners since the grain boundary strengtheners are generally already present in the polycrystalline substrate alloy. In nickel-based repair alloys of the present invention, boron, hafnium and zirconium are utilized as grain boundary strengtheners.

It is also important that the repair alloys of the present invention have excellent oxidation resistance. Thus, it is desirable to add one or more elements that enhance oxidation resistance. Elements that enhance oxidation resistance in alloys are known in the metallurgical arts, and may vary depending upon the composition of the matrix alloy. Yttrium, and the rare earth elements can be added to enhance oxidation resistance. In the present invention, yttrium is used to enhance the oxidation resistance of a nickel-based repair alloy.

Grain boundary strengthening elements can reduce oxidation resistance. In the repair alloys of the present invention, levels of particular elements, especially boron, hafnium, zirconium and yttrium, are controlled to maximize high temperature capability and oxidation resistance.

The build-up repair alloys of the present invention are applied by low substrate heat input build-up processes including: laser welding, plasma transfer arc welding and low pressure plasma spray.

Repair methods of the present invention offer many advantages over conventional brazing repairs. The above-described low substrate heat input build-up repair processes melt the repair alloy prior to application to the substrate, thus significantly reducing heating of the substrate alloy and thereby reducing the possibilities of heat-altered zone cracking and overall recrystallization of the repair article. Avoiding overall recrystallization is especially advantageous in single crystal repair applications where substrate recrystallization property debit concerns limit the upper bounds of thermal processing.

Brazing repair forces thermal treatment of the entire repair article. In contrast, the methods of the present invention allow repair of the damaged area while the critical property regions (e.g., high stress attachment features of turbine blades and vanes) avoid exposure to high temperature.

Repair alloys for brazing applications require substantial amounts of boron and/or silicon to depress the melting points of the alloys. The repair methods of the present invention do not require the repair alloys to have substantially lower melting temperatures than the substrates and thus, far less boron and/or silicon is required in the repair alloys of the present invention. As a result, oxidation resistance has been significantly improved. Also, the repair methods of the present invention enable the composition of the repair alloys of the present invention to be adjusted to more closely match the compositions of the substrate alloys.

The present invention provides a method of creating a build-up alloy application on a single crystal superalloy substrate. In this method a repair alloy is formulated to contain substantially the same elements in substantially the same proportions as in the single crystal substrate except that the repair alloy additionally contains a grain boundary strengthener element or elements; and the repair alloy is applied to the single crystal substrate by a low substrate heat input buildup process. In another preferred embodiment of this method, the repair alloy additionally contains an element that enhances oxidation resistance preferably yttrium. It is preferred that the levels of additional grain boundary strengtheners are insufficient to substantially reduce the bulk melting point of the repair alloy (i.e. substantially less boron than is used to depress the melting point of repair alloys in brazing techniques).

The present invention also provides a polycrystalline nickel-based alloy comprising 0.03 to 2.5 weight % hafnium, 0.003 to 0.32 weight % boron, 0.007 to 0.35 weight % zirconium, and 0.02 to 0.16 weight % yttrium. (Unless otherwise indicated, all percentages and parts per million (ppm) set forth herein are weight percentages.) This combination of elements results in particularly desirable characteristics of nickel-based alloys for build-up applications.

It is particularly important to control the levels of yttrium in the nickel-based repair alloys of the present invention, levels of yttrium less than about 0.02% do not impart a sufficient degree of oxidation resistance. Levels of yttrium substantially in excess of about 0.16% do not improve oxidation resistance and may, depending on various factors such as intended application and thermal processing, introduce undesirable characteristics such as precipitation of yttride phases and changes in melting properties.

Within the above-described ranges of hafnium, boron, zirconium, and yttrium, it is desirable that the composition of the nickel-based repair alloy of the present invention be selected to correspond to the composition of the substrate alloy. In a preferred embodiment, shown in the table below, the composition ranges, by percent, of two nickel-based single crystal substrates and the composition range of a repair alloy for the repair of nickel-based single crystal substrates are:

TABLE 1

|         | substrate alloy      | substrate alloy      | repair alloy         |
|---------|----------------------|----------------------|----------------------|
| Cr      | 9.5–10.5             | 4.75–5.25            | 4.75–10.5            |
| Al      | 4.75–5.25            | 5.5–5.8              | 4.75–5.8             |
| W       | 3.75–4.25            | 5.6–6.2              | 3.75–6.2             |
| Ta      | 11.75–12.25          | 8.4–9.0              | 8.4–12.25            |
| Mo      | —                    | 1.7–2.1              | 0–2.1                |
| Co      | 4.5–5.5              | 9.5–10.5             | 4.5–10.5             |
| Ti      | 1.25–1.75            | —                    | 0–1.75               |
| Cb(Nb)  | —                    | —                    | —                    |
| Re      | —                    | 2.8–3.2              | 0–3.2                |
| C       | 0.050                | 0.050                | 0.05–0.17            |
| B       | 0.0030               | 0.0030               | 0.003–0.32           |
| Zr      | 0.0075               | 0.0075               | 0.007–0.15           |
| Y       | —                    | —                    | 0.02–0.16            |
| Hf      | 0.0030               | 0.05–0.15            | 0.03–1.9             |
| Ni      | essentially remainder | essentially remainder | essentially remainder |

In another preferred embodiment, shown in the following table, percent composition ranges of two directionally solidified (i.e. columnar) nickel-based superalloy substrates and the composition range of a repair alloy for the repair of directionally solidified nickel-based superalloy substrates are:

TABLE 2

|         | substrate alloy      | substrate alloy      | repair alloy         |
|---------|----------------------|----------------------|----------------------|
| Cr      | 8–10                 | 6.0–6.8              | 6.0–10.00            |
| Al      | 4.75–5.25            | 5.7–6.1              | 4.75–6.1             |
| W       | 11.5–12.5            | 6.0–6.8              | 6.0–12.5             |
| Ta      | —                    | 3.75–4.25            | 0–4.25               |
| Mo      | —                    | 1.5–1.9              | 0–1.9                |
| Co      | 9.25–11.0            | 12.1–13.0            | 9.25–13.0            |
| Ti      | 1.75–2.25            | —                    | 0–2.25               |
| Cb(Nb)  | 0.75–1.25            | —                    | 0–1.25               |
| Re      | —                    | 2.75–3.25            | 0–3.25               |
| C       | 0.12–0.16            | 0.08–0.12            | 0.08–0.16            |
| B       | 0.010–0.020          | 0.010–0.015          | 0.003–0.020          |
| Zr      | 0.120                | 0.04–0.12            | 0.04–0.12            |
| Y       | —                    | —                    | 0.02–0.16            |
| Hf      | 1.50–2.50            | 1.0–2.0              | 1.0–2.5              |
| Ni      | essentially remainder | essentially remainder | essentially remainder |

In another preferred embodiment, shown in the table below, percent composition ranges of four equiaxed substrate alloys and the composition range of a repair alloy for the repair of equiaxed alloys are:

TABLE 3

|     | substrate alloy | substrate alloy | substrate alloy | substrate alloy | repair alloy |
|-----|-----------------|-----------------|-----------------|-----------------|--------------|
| Cr  | 7.5–8.5         | 8.0–8.8         | 9.5–10.5        | 8.0–11.0        | 7.5–11.0     |
| Al  | 5.75–6.25       | 5.3–5.7         | 6.5–6.7         | 5.0–6.0         | 5.0–6.7      |
| W   | —               | 9.5–10.5        | 3.0–3.4         | —               | 0–10.5       |
| Ta  | 4.0–4.5         | 2.8–3.3         | 3.9–4.3         | —               | 0–4.5        |
| Mo  | 5.75–6.25       | 0.5–0.8         | 1.75–2.25       | 2.0–4.0         | 0.5–6.25     |
| Co  | 9.5–10.5        | 9–11            | —               | 13–17           | 0–17.0       |
| Ti  | 0.8–1.2         | 0.9–1.2         | —               | 4.5–5.0         | 0–5.0        |

TABLE 3-continued

|    | substrate alloy | substrate alloy | substrate alloy | substrate alloy | repair alloy |
|----|----|----|----|----|----|
| Cb(Nb) | — | — | — | — | — |
| Re | — | — | — | — | — |
| C  | 0.08–0.13 | 0.13–0.17 | 0.08–0.13 | 0.15–0.20 | 0.08–0.20 |
| B  | 0.01–0.02 | 0.01–0.02 | 0.004–0.01 | 0.01–0.02 | 0.003–0.020 |
| Zr | 0.03–0.13 | 0.03–0.08 | 0.25–0.35 | 0.03–0.09 | 0.03–0.35 |
| Y  | — | — | — | — | 0.02–0.16 |
| Hf | 1.05–1.2 | 1.2–1.6 | 1.05–1.25 | — | 1.05–1.6 |
| Ni | essentially remainder | essentially remainder | essentially remainder | essentially remainder | essentially remainder |

In the nickel-based alloys of the present invention, certain elements that are present either as impurities or minor additions are preferably controlled to be no more than: 0.56% silicon, 0.12% manganese, 0.015% phosphorus, 0.015% sulfur, 0.20% iron, 0.10% copper, 0.0005% lead, 0.00003% bismuth, 0.0001% selenium, 0.00005% tellurium, and 0.00005% thallium. In other more preferred embodiments, the polycrystalline nickel-based alloys of the present invention described above, comprise 0.13–0.17% carbon, 0.01–0.15% zironium, 0.02–0.16% yttrium, 0.9–1.9% hafnium and 0.003–0.010% boron. In a still more preferred embodiment, nickel-based alloys of the present invention comprise about 1.4 weight % hafnium, about 0.005 weight % boron, about 0.15% carbon, about 0.07 weight % zirconium, and about 0.10 weight % yttrium.

In another preferred embodiment, a protective coating is applied to the surface of the build-up repair alloy which has been applied to the substrate alloy. The protective coating layer may be applied by conventional processes. In a preferred embodiment, the protective coating layer is an aluminide-based coating as described in U.S. Pat. Nos. 4,132,816; 4,148,275; 4,585,481; 4,897,315; 4,910,092; 4,933,239; and reissue 32,121. In some embodiments, the heat treatment of the protective coating may obviate the need for diffusion and/or stress relief heat treatment of the repair alloy after application to the substrate.

In order to achieve the best thermal match between the substrate alloy and repair alloy, it is desirable to tailor the composition of the repair alloy to the substrate on which the alloy is to be applied. However, in some situations, economic considerations favor use of a nickel-based alloy of the present invention for build-up applications on nickel-based substrates having a variety of compositions.

The methods and alloys of the present invention are useful for build-up applications on alloy substrates, especially nickel-based superalloy substrates, and especially nickel-based single crystal superalloy substrates. Alloys and methods of the present invention can be used to effect repairs of manufacturing defects as well as defects caused by erosion and wear. Alloys and methods of the present invention are particularly useful for the repair of turbine engine components. They are also useful for other build-up applications that require good durability and oxidation resistance at high temperature.

BRIEF DESCRIPTION OF THE DRAWINGS

The file of this patent contains at least one photograph executed in color. Copies of this patent with the color photograph(s) will be provided by the Patent and Trademark Office upon request and payment of the necessary fee.

DETAILED DESCRIPTION OF THE INVENTION

Figure 1:
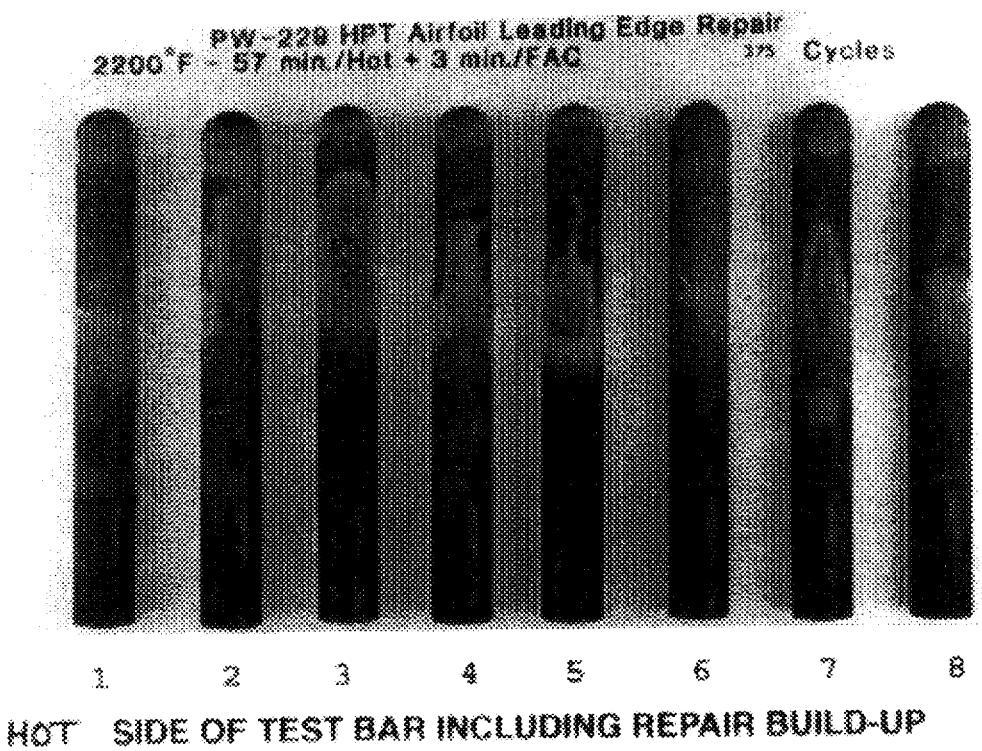
FIG. 1 illustrates the effects of Burner Rig Testing at 2200° F. on a variety of repair alloys and coatings. The repair alloys have been applied to a divot machined on the surface of the nickel-based single crystal superalloy substrate rods. The numbers beneath each rod correspond to the numbered alloys as they appear in Table 5. Testing conditions were: 2200° F. for 375 cycles of 57 minutes hot and 3 minutes forced air cool (FAC) in each cycle.

The present invention provides a method of repairing a single crystal alloy by the use of a repair alloy whose composition is substantially similar to that of the single crystal alloy substrate, and in addition contains at least one grain boundary strengthening element and preferably contains an additional element or elements that increase the oxidation resistance of the polycrystalline repair alloy. The repair alloy can be applied by methods including: low pressure plasma spray, laser welding, and plasma transferred arc welding. The repair method of the present invention can be applied, for example, to the leading edge of a turbine blade that has suffered erosion damage. The damaged portion of the blade can be removed by blending and the repair alloy applied to the blended area, followed by recontouring to the original dimensions.

The present invention provides a polycrystalline nickel alloy comprising 0.03 to 1.9 weight % hafnium, 0.003 to 0.32 weight % boron, 0.01 to 0.35 weight % zirconium and 0.02 to 0.16 weight % yttrium. This alloy exhibits good strength and oxidation resistance at high temperatures. In repair applications of the present invention, it is preferred that the alloy contain no more than about 0.010 weight % boron. Larger amounts of boron depress the overall melting point of the alloy system and also result in undesirable oxidation blistering during high temperature exposure.

The nickel alloys of this invention are usually produced by forming ingots of the inventive composition by conventional vacuum induction melting techniques. In preferred embodiments, the alloy is subsequently converted to a powder by gas atomizing or rotary atomizing.

In a preferred embodiment, the powderized repair alloy is applied by a low pressure plasma spray technique. Prior to the plasma spray it is important that the part be thoroughly cleaned and free of dirt, grit, oil, grease or other foreign materials. A coating is then applied by high velocity plasma arc spray of the repair alloy. Optionally, a powder of the repair alloy may be blended with a relatively small amount of a braze alloy powder. The coated part is then heat treated. If desired, the surface can be hardened by peening with dry glass or ceramic beads or steel shot. The low pressure plasma spray technique is discussed in U.S. Pat. Nos. 4,585,481 and 3,928,026.

In another preferred embodiment, the repair alloy is applied by laser cladding (welding). Laser cladding can operate using the repair alloy either in powder, preform or wire form. The laser melts the alloy over the area to be repaired to form a coating, which is subsequently annealed. The laser cladding technique is generally discussed in Eboo et al., "Laser Cladding of Gas Turbine Components", ASME Publication 86-61-298, 1976.

In another preferred embodiment of the present invention, a powdered repair alloy is applied using the plasma transferred arc welding technique. This technique is described in U.S. Pat. No. 4,878,953 (Saltzman et al.).

In one embodiment of the present invention a buildup application of nickel-based repair alloy of the present invention is applied to a single crystal nickel-based superalloy. Compositions of the substrate alloy and the corresponding repair alloy, in weight %, are set forth in the table below:

TABLE 4

|  | single crystal substrate alloy | repair alloy |
|---|---|---|
| Cr | 4.75–5.25 | 4.75–5.25 |
| Al | 5.5–5.8 | 5.5–5.8 |
| W | 5.6–6.2 | 5.6–6.2 |
| Ta | 8.4–9.0 | 8.4–9.0 |
| Mo | 1.7–2.1 | 1.7–2.1 |
| Co | 9.5–10.5 | 9.5–10.5 |
| Ti | — | — |
| Cb(Nb) | — | — |
| Re | 2.8–3.2 | 2.8–3.2 |
| C | 0.050 | 0.05–0.17 |
| B | 0.0030 | 0.003–0.32 |
| Zr | 0.0075 | 0.007–0.15 |
| Y | — | 0.02–0.16 |
| Hf | 0.05–0.15 | 0.05–1.9 |
| Ni | essentially remainder | essentially remainder |

Preferably the presence of various additional elements, either as minor additions or as impurities, is limited in the substrate alloy and the repair alloy to the following limits, in weight percent: 0.12% silicon (in less preferred embodiments up to 0.56% silicon in the repair alloy), 0.12% manganese, 0.015% phosphorus, 0.015% sulfur, 0.20% iron, 0.10% copper, 0.0005% lead, 0.00003% bismuth, 0.0001% selenium, 0.00005% tellurium, and 0.00005% thallium. In more preferred embodiments, the repair alloy contains about: 0.15% carbon, 0.005% boron, 0.07% zirconium, 0.10% yttrium, and 1.4% hafnium.

Burner Rig Testing results (see Table 5 and FIGS. 1 and 2) demonstrate that the build-up repair method of the present invention and an alloy of the present invention (see test bars 2 and 3) are effective in the repair of a damaged single crystal substrate alloy and are superior when compared with other repair methods and alloys.

Figure 2:
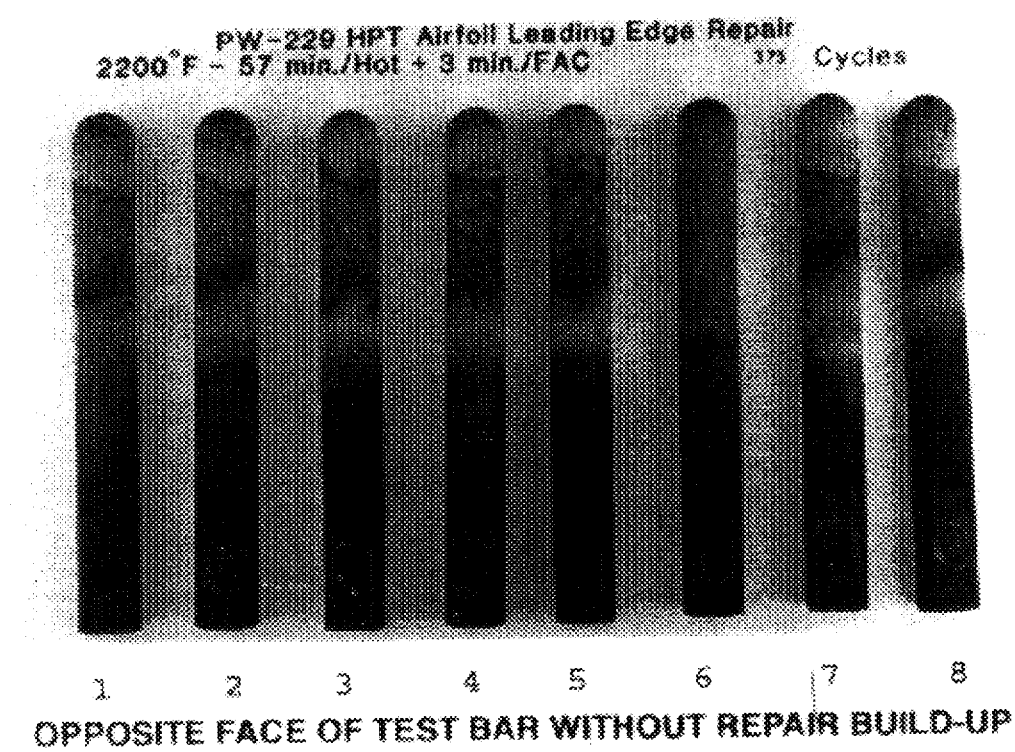
FIG. 2 shows the opposite unrepaired side of the same set of burner rig test bars shown in FIG. 1 at the same test inspection interval.

Visual inspection results of the single crystal test specimens following burner rig oxidation testing for 375 cycles at 2200° F. are seen in FIGS. 1 and 2. FIG. 1 shows the repaired regions on the hot side (exposed to burner flame) of the single crystal burner rig test specimens. A focused inspection of the repaired regions on specimens of the present invention (see bars 2 and 3) show minimal oxidation erosion or blistering in comparison to the baseline specimen (bar 1). The best indication of good oxidation performance is displayed in samples (such as test bars 2 and 3) that form adherent surface oxidation layers that are typically dull gray in surface appearance. Examples of unacceptably high oxidation erosion and blistering are displayed on repaired regions of test bars 4 and 5.

Burner Rig Testing: Test Bar Preparation

All of the test bars were composed of the same nickel-based superalloy described in the preferred embodiment of U.S. Pat. No. 4,719,080. The baseline result was established by test bar 1 which consisted only of the substrate alloy coated with an aluminide alloy as described in U.S. Pat. Nos. 4,132,816 and 4,148,275.

In test bars 2–8, a 0.30 inch deep divot was blended into each bar. The surface of the divot was cleaned by blasting with fine alumina. Except for test bars 6 and 8, a repair alloy was applied into each depression and the bar was recontoured to the initial diameter of the test bar. The test bars were then coated with a protective coating. All of the protective coatings were diffused at a temperature of about 2050° F.

Test bar 2 was repaired utilizing a repair alloy having the composition, in weight percent:

| Aluminum | 5.73 |
|---|---|
| Boron | 0.021 |
| Carbon | 0.15 |
| Cobalt | 9.93 |
| Chromium | 4.99 |
| Copper | <1.10 |
| Iron | <0.20 |
| Hafnium | 1.21 |
| Molybdenum | 1.92 |
| Manganese | <0.12 |
| Oxygen | 0.0170 |
| Phosphorus | <0.015 |
| Sulfur | <0.015 |
| Silicon | <0.12 |
| Tantalum | 7.89 |
| Lead | <0.0005 |
| Tungsten | 6.19 |
| Yttrium | 0.07 |
| Zirconium | 0.090 |
| Rhenium | 3.09 |
| Selenium | <0.0001 |
| Bismuth | <0.00003 |
| Nickel | balance |

This repair alloy was blended with a nickel-based braze alloy containing 4.5 weight % silicon and 3.0 weight % boron. The alloys were mixed in a ratio of nine parts repair alloy to one part braze alloy. The mixture was applied to the substrate by low pressure plasma spray. The repair test bar was then coated as described for test bar 1.

Test bar 3 was repaired as described above for test bar 2, but then coated with an aluminide coating as described in U.S. Pat. Nos. 3,102,044 and 3,544,348. The repaired test bars were heat treated at 1975° F. for 4 hours in a protective atmosphere and cooled to below 800° F. at 40°/minute or faster.

Test bar 4 was repaired using powder fed plasma transferred arc welding with an alloy having the nominal composition Co, 20% Cr, 15% Ni, 9.0% W, 4.4% Al, 3.0% Ta, 1.1% Hf, 0.2% Ti, 0.04% Y, 0.35% C. The powder size used was between 100 and 325 mesh size. The repaired bar was coated with the same coating as test bar 1.

Test bar 5 was repaired using the same alloy and technique as test bar 4. The repair test bar was coated using the same coating as test bar 3.

Test bar 6 was not repaired and was coated with a 0.002–0.003 inch aluminide coating by the techniques disclosed in U.S. Pat. Nos. 4,585,481; 4,897,315; 4,910,092; 4,933,239; and reissue 32,121.

Test bar 7 was repaired using a NiAlY repair alloy and coated with the same coating as test bar 1.

Test bar 8 was not repaired, but was coated with the aluminide coating of test bar 1.

Although the invention has been described in conjunction with specific embodiments, many alternatives and variations will be apparent to those skilled in the art in light of the foregoing description. Accordingly, the invention is intended to embrace all of the alternatives and variations that fall within the spirit and scope of the appended claims.

TABLE 5

| | Burner Rig Testing[1] | | |
|---|---|---|---|
| | Test Bar | Repair Alloy | Protective Coating |
| 1. | Baseline (no blend) | None | A[2] |
| 2. | LPPS - applied | 90% repair alloy 10% braze alloy | A |
| 3. | LPPS - applied | 90% grain-strengthened 10% braze alloy | B[3] |
| 4. | PTA - applied | Co superalloy | A |
| 5. | PTA - applied | Co superalloy | B |
| 6. | Blend only | None | C[4] |
| 7. | LPPS - applied | NiAlY | A |
| 8. | Blend only | None | A |

[1] All repair test bars were blended 0.030 inch deep, repaired (except bars 1, 6 and 8), recontoured, coated, and burner rig tested at 2200° F. for 365 cycles. See FIGS. 3A and 3B.
[2] A — coating applied as described in U.S. Pat. Nos. 4,132,816 and 4,148,275.
[3] B — coating applied as described in U.S. Pat. Nos. 3,102,044 and 3,544,348.
[4] C — coating applied as described in U.S. Pat. Nos. 4,585,481; 4,897,315; 4,910,092; 4,933,239; and reissue 32,121.

We claim:

1. A repaired superalloy comprising a directionally solidified nickel based superalloy substrate having applied thereon a nickel-based repair alloy wherein said repair alloy comprises the following elements, in weight percent:

| | |
|---|---|
| chromium | 6.0–10.0 |
| aluminum | 4.75–6.1 |
| tungsten | 6.0–12.5 |
| tantalum | 0–4.25 |
| molybdenum | 0–1.9 |
| cobalt | 9.25–13.0 |
| titanium | 0–2.25 |
| niobium | 0–1.25 |
| rhenium | 0–3.25 |
| carbon | 0.08–0.16 |
| boron | 0.003–0.020 |
| zirconium | 0.04–0.12 |
| yttrium | 0.02–0.16 |
| hafnium | 1.0–2.5 |
| nickel | remainder. |

2. The repaired superalloy of claim 1, wherein said repair alloy consists essentially of the following elements, in weight percent:

| | |
|---|---|
| chromium | 6.0–10.0 |
| aluminum | 4.75–6.1 |
| tungsten | 6.0–12.5 |
| tantalum | 0–4.25 |
| molybdenum | 0–1.9 |
| cobalt | 9.5–13.0 |
| titanium | 0–2.25 |
| niobium | 0–1.25 |
| rhenium | 0–3.25 |
| carbon | 0.08–0.16 |
| boron | 0.003–0.020 |
| zirconium | 0.04–0.12 |
| yttrium | 0.02–0.16 |
| hafnium | 1.0–2.5 |
| nickel | remainder. |

3. The repaired superalloy of claim 1 wherein said substrate is a jet engine component.

4. A repaired nickel-based superalloy comprising a nickel-based single crystal superalloy substrate and having applied thereon a nickel-based repair alloy;

wherein said repair alloy comprises the following elements, in weight percent:

| | |
|---|---|
| chromium | 4.75–10.5 |
| aluminum | 4.75–5.8 |
| tungsten | 3.75–6.2 |
| molybdenum | 0–2.1 |
| cobalt | 4.5–10.5 |
| titanium | 0–1.75 |
| rhenium | 0–3.2 |
| tantalum | 8.4–12.25 |
| carbon | 0.05–0.17 |
| boron | 0.003–0.320 |
| zirconium | 0.007–0.15 |
| yttrium | 0.02–0.16 |
| hafnium | 0.03–1.9 |
| nickel | remainder. |

5. The repaired superalloy of claim 4 wherein said substrate is a jet engine component.

6. The repaired superalloy of claim 4 wherein said substrate is a turbine blade.

7. A repaired nickel-based superalloy comprising a nickel-based single crystal superalloy substrate and having applied thereon a nickel-based repair alloy;

wherein said repair alloy consists essentially of the following elements, in weight percent:

| | |
|---|---|
| chromium | 4.75–10.5 |
| aluminum | 4.75–5.8 |
| tungsten | 3.75–6.2 |
| molybdenum | 0–2.1 |
| cobalt | 4.5–10.5 |
| titanium | 0–1.75 |
| rhenium | 0–3.2 |
| tantalum | 8.4–12.25 |
| carbon | 0.05–0.17 |
| boron | 0.003–0.320 |
| zirconium | 0.007–0.15 |
| yttrium | 0.02–0.16 |
| hafnium | 0.03–1.9 |
| nickel | remainder. |

8. A repaired nickel based superalloy made by a process in which a repair alloy is applied onto a single crystal nickel based superalloy substrate, wherein said substrate is a single crystal jet engine component and wherein said process is a low substrate heat input buildup process, and wherein said repair alloy comprises the following elements, in weight percent:

| | |
|---|---|
| chromium | 4.75–10.5 |
| aluminum | 4.75–5.8 |
| tungsten | 3.75–6.2 |
| molybdenum | 0–2.1 |
| cobalt | 4.5–10.5 |
| titanium | 0–1.75 |
| rhenium | 0–3.2 |
| tantalum | 8.4–12.25 |
| carbon | 0.05–0.17 |
| boron | 0.003–0.320 |
| zirconium | 0.007–0.15 |
| yttrium | 0.02–0.16 |
| hafnium | 0.03–1.9 |
| nickel | remainder. |

9. A repaired nickel-based superalloy comprising a single crystal nickel-based superalloy substrate and, having applied thereon, a nickel based repair alloy; wherein said nickel-based repair alloy is composed of the same elements in the same proportions as in said single crystal substrate except that said repair alloy additionally comprises at least one grain boundary strengthener element or an additional amount of at least one grain boundary strengthener element and 0.02 to 0.16 weight % yttrium; and wherein said superalloy substrate comprises, in weight %:

| | |
|---|---|
| chromium | 4.75–5.25 |
| aluminum | 5.5–5.8 |
| tungsten | 5.6–6.2 |
| tantalum | 8.4–9.0 |
| molybdenum | 1.7–2.1 |
| cobalt | 9.5–10.5 |
| titanium | — |
| niobium | — |
| rhenium | 2.8–3.2 |
| carbon | 0.050 |

-continued

| | |
|---|---|
| boron | 0.003 |
| zirconium | 0.0075 |
| yttrium | — |
| hafnium | 0.05–0.15 |
| nickel | essentially remainder. |

10. The repaired nickel-based superalloy of claim 9 wherein said repair alloy comprises 0.01 to 0.15 weight % zirconium and 0.9 to 1.9 weight % hafnium.

* * * * *